Patented May 5, 1942

2,282,033

UNITED STATES PATENT OFFICE 2,282,033

TREATMENT OF HYDROCARBON OILS

Vladimir L. Chechot, Philadelphia, Pa., assignor to The Atlantic Refining Company, Philadelphia, Pa., a corporation of Pennsylvania No Drawing. Application November 3, 1939, Serial No. 302,699

10 Claims. (Cl. 196—40)

The present invention relates to the refining of viscous hydrocarbon oils, and relates more particularly to improvements in the technique of acid treating lubricating oil stocks, whereby economies in acid consumption and recovery are effected, higher yields of treated oil are realized, and difficulties involved in the handling and disposal of acid sludge are obviated.

In the refining of lubricating oil stocks by treatment with sulfuric acid there is formed a sludge comprising tarry reaction products and diluted sulfuric acid. While the bulk of this sludge separates fairly readily from the treated oil, there remains in suspension in the oil a relatively small amount of finely-divided sludge or "pepper" which will not settle within a reasonable period of time. In order to effect removal of this residual sludge or "pepper," it has been conventional practice to subject the treated oil to spray washing with water, whereby the suspended sludge particles are coagulated and caused to settle from the oil. However, spray washing or water coagulation is disadvantageous in that the coagulated sludge is hard and coky and difficult to handle, and the sulfuric acid which may be recovered from the sludge is undesirably diluted, thus increasing the cost of subsequent concentration to useful strength.

It has been proposed heretofore to effect removal of residual sludge or "pepper" from acid treatly oils by agitating the oil with finely-divided mineral substances such as fuller's earth, bentonite, bauxite, comminuted granite, and talc, in order to coagulate or gather the "pepper," and thereafter separate the mineral-sludge mixture from the oil. Since erosion of pumping equipment is a major factor to be considered in the handling and disposal of acid sludge, the use of fuller's earth, bentonite, bauxite, and comminuted granite is impractical. While these substances function satisfactorily as sludge coagulants, their abrasive character renders them unfit for this purpose. Furthermore, the sludges coagulated or gathered by the use of these substances is hard or grainy, and difficult to pump in conventional equipment. However, of these substances, it was found that talc would produce soft sludges which could be pumped, although none too readily, without serious erosion of the pumping equipment, but tended to float substantial quantities of the gathered sludge in the treated oil, thereby rendering separation of the talc-sludge from the oil a difficult and impractical operation.

I have found that such difficulty may be overcome by employing, in lieu of talc, a mixture of finely-divided mica and talc. Such mixture is not only highly effective in gathering suspended sludge, but is readily removed from the oil by settling. In treating oils containing residual suspended sludge, I add to the oil a small amount of a mixture of mica and talc, for example, 0.1% to about 0.5% by weight of the oil, agitate the oil-mica-talc mixture by air blowing or by mechanical means for a period of time sufficient to effect gathering of the sludge particles, and thereafter permit the mica-talc-sludge to settle from the oil. The oil, substantially free of suspended sludge, may then be decanted or otherwise separated by the mica-talc-sludge, and thereafter finished by caustic neutralization, water washing, and/or clay filtering. I may employ a mica-talc mixture having a size of the order of from 30 to 300 mesh, and preferably from 100 to 200 mesh, the ratio of mica to talc being variable but preferably of the order of 2 parts to 1 by weight.

In accordance with my invention, I may add a suitable proportion of a mica-talc mixture to the viscous hydrocarbon oil before or during the acid treating step, or after the oil has been acid treated and the major portion of the acid sludge has been removed.

My invention may be further illustrated by the following examples, which, however, are not to be considered as limiting the scope thereof.

(1) A lubricating oil stock having a Saybolt universal viscosity of 67" at 100° F., an A. P. I. gravity of 29.6°, and an A. S. T. M. color of 2+, was agitated by means of air with 11 lbs. per bbl. of 66° Bé. sulfuric acid for a period of 20 minutes at a temperature of 84° F. The bulk of the acid sludge was then settled and drawn off, and the treated oil containing suspended sludge particles or "pepper" was thoroughly admixed with 0.25% by weight of a mixture of finely-divided mica and talc, the ratio of mica to talc being 2 to 1. The suspended sludge particles, gathered by the mira-talc, formed a soft sludge which settled from the oil and was withdrawn therefrom after a 6 hour settling period. The treated oil, free of suspended sludge, was neutralized with soda ash solution, steamed at 140° F., and settled for a period of 3 hours. The neutralized oil was then separated from the spent soda ash solution, and thereafter water washed and air brightened at 140° F. There was obtained by this treatment a yield of 94.5% of finished oil having a Saybolt universal viscosity of 67" at 100° F., an A. P. I. gravity of 30.2°, and an A. S. T. M. color of 1+.

The sludge resulting from the treatment above described was semi-fluid, of uniform consistency, and readily pumpable without erosion of pumping equipment.

The same lubricating oil stock, when subjected to substantially the same treatment as above set forth, with the exception that the coagulation or gathering of the suspended sludge or "pepper" was effected by spray washing with water at the completion of the acid treating step, yielded 94% of finished oil having a Saybolt Universal viscosity of 66" at 100° F., an A. P. I. gravity of 30.2°, and an A. S. T. M. color of 1¼+. However, the sludge resulting from the spray washing step was less fluid than that from mica-talc settling, contained hard granular material, and was not readily pumpable.

(2) A lubricating oil stock having a Saybolt Universal viscosity of 316 seconds at 100° F., an A. P. I. gravity of 24.4°, and an A. S. T. M. color of 3¼ Dilute, was agitated by means of air with 5 lbs. per bbl. of 66° Bé. sulfuric acid for a period of 20 minutes at a temperature of 82° F. The resulting acid sludge was then settled and drawn off, and the oil again treated with 8 lbs. per bbl. of 66° Bé. sulfuric acid. The bulk of the acid sludge was settled and drawn off, and the treated oil containing suspended sludge particles or "pepper" was thoroughly admixed with 0.25% by weight of a mixture of finely-divided mica and talc, the ratio of mica to talc being 2 to 1. The suspended sludge particles, gathered by the mica-talc, formed a soft sludge which settled from the oil and was withdrawn therefrom after a 14 hour settling period. The treated oil, free of suspended sludge, was neutralized with 14° Bé. caustic soda solution, steamed, and settled at 180° F. for a period of 4 hours. The neutralized oil was then separated from the spent caustic soda solution, and thereafter water washed and air brightened at 170° F. There was obtained by this treatment a yield of 89.5% of finished oil having a Saybolt Universal viscosity of 301 seconds at 100° F., an A. P. I. gravity of 25.0°, and an A. S. T. M. color of 4½. The sludge resulting from the treatment above described was soft, plastic, grease-like in consistency, and readily pumpable without erosion of pumping equipment.

The same lubricating oil stock, when subjected to substantially the same treatment as above set forth, with the exception that the coagulation or gathering of the suspended sludge or "pepper" was effected by spray washing with water at the completion of the acid treating step, yielded 87.2% of finished oil having a Saybolt Universal viscosity of 307 seconds at 100° F., an A. P. I. gravity of 25.0°, and an A. S. T. M. color of 4¾+. However, the sludge resulting from the spray washing step was hard and lumpy, and not readily pumpable, in contrast to the soft sludge obtained when employing mica-talc as the gathering medium.

(3) A lubricating oil stock having a Saybolt Universal viscosity of 625 seconds at 100° F., an A. P. I. gravity of 22.2°, and an A. S. T. M. color of 2½ dilute, was agitated by means of air with 9 lbs. per bbl. of 66° Bé. sulfuric acid for a period of 20 minutes at a temperature of 96° F. The resulting acid sludge was then settled and drawn off, and the oil again treated with 14.5 lbs. per bbl. of 98% sulfuric acid. The bulk of the acid sludge was settled and drawn off, and the treated oil containing suspended sludge particles or "pepper" was thoroughly admixed with 0.25% by weight of a mixture of finely-divided mica and talc, the ratio of mica to talc being 2 to 1. The suspended sludge particles, gathered by the mica-talc, formed a soft, fluid sludge which settled from the oil and was withdrawn therefrom after a 15 hour settling period. The treated oil, free of suspended sludge, was neutralized with 14° Bé. caustic soda solution, steamed, and settled for a period of 10 hours. The neutralized oil was then separated from the spent caustic soda solution, and thereafter water washed and air brightened at 160° F. There was obtained by this treatment a yield of 83.8% of finished oil having a Saybolt Universal viscosity of 520 seconds at 100° F., an A. P. I. gravity of 23.1°, and an A. S. T. M. color of 3½. The sludge resulting from the treatment above described was soft, semi-plastic, of uniform consistency, and readily pumpable without erosion of pumping equipment.

The same lubricating oil stock, when subjected to substantially the same treatment as above set forth, with the exception that the coagulation or gathering of the suspended sludge or "pepper" was effected by spray washing with water toward the end of the second acid treating step, yielded 83.8% of finished oil having a Saybolt Universal viscosity of 537 seconds at 100° F., an A. P. I. gravity of 23.0°, and an A. S. T. M. color of 4. However, the sludge resulting from the spray washing step was medium hard and grainy, and not readily pumpable, in contrast to the soft sludge obtained when employing mica-talc as the gathering medium.

It will be seen, from the examples above given, that by my process there may be obtained, in general, higher yields of finished lubricating oils of lighter color than are obtained by conventional treating methods involving the water settling of suspended sludge or "pepper." Furthermore, the acid sludges produced in my process are soft and greasy, of uniform consistency and readily pumpable, as contrasted with the hard, coky, unpumpable sludges resulting from water settling. Since the sludges produced by mica-talc settling are not diluted with water, as in the case of water-settled sludges, sulfuric acid may be recovered from such mica-talc sludges in a more concentrated state, thereby effecting economies in the operation of an acid recovery system wherein spent acid is concentrated to useful strength.

Thus, as will be gathered from the foregoing, my invention resides in the discovery of a mixture of materials that has the property of forming with acid sludge a relatively greasy, substantially non-abrasive, readily pumpable mass that will settle from viscous hydrocarbon oil in a reasonably short period of time. The illustrative embodiment of my mixture, referred to above, namely, a mica-talc mixture, normally is to be used in small quantities, is relatively inexpensive, imparts a greasiness to the settled sludge mass, is non-abrasive, and functions to coagulate the sludge and to cause it to settle from the oil. It is to be understood, therefore, that my invention is not limited to employment of a mica-talc mixture only. For example, in lieu of talc, I may employ pyrophyllite, and in lieu of mica I may, for instance, employ a synthetic or naturally occurring substance that has a specific gravity substantially that of mica, is non-reactive with acid and has the greasiness-imparting property referred to above.

What I claim is:

1. The process of refining viscous hydrocarbon oil, which comprises adding to the oil a small quantity of finely-divided mica and talc, contacting the mixture with sulfuric acid, and separating from the treated oil the mica-talc mixture containing entrained acid sludge.

2. The process of refining viscous hydrocarbon oil, which comprises adding to the oil a small quantity of finely-divided mica and talc, contacting the mixture with sulfuric acid, separating from the treated oil the mica-talc mixture containing entrained acid sludge, and neutralizing the treated oil with an alkaline agent.

3. The process of refining viscous hydrocarbon oil, which comprises adding to the oil from about 0.1% to about 0.5% by weight of finely-divided mica and talc, contacting the mixture with sulfuric acid, and separating from the treated oil the mica-talc mixture containing entrained acid sludge.

4. The process of refining viscous hydrocarbon oil, which comprises adding to the oil from about 0.1% to about 0.5% by weight of finely-divided mica and talc, the ratio of mica to talc being about 2 parts to 1 by weight, contacting the mixture with sulfuric acid, and separating from the treated oil the mica-talc mixture containing entrained acid sludge.

5. The process of refining viscous hydrocarbon oil, which comprises treating the oil with sulfuric acid, settling and removing the major portion of the sludge, then agitating the treated oil with a small quantity of finely-divided mica and talc to gather residual suspended sludge, and separating the mica-talc mixture containing entrained sludge from said treated oil.

6. The process of refining viscous hydrocarbon oil, which comprises treating the oil with sulfuric acid, settling and removing the major portion of the sludge, then agitating the treated oil with a small quantity of finely-divided mica and talc to gather residual suspended sludge, separating the mica-talc mixture containing entrained sludge from said treated oil, and neutralizing the treated oil with an alkaline agent.

7. The process of refining viscous hydrocarbon oil, which comprises treating the oil with sulfuric acid, settling and removing the major portion of the sludge, then agitating the treated oil with from about 0.1% to about 0.5% by weight of finely-divided mica and talc to gather residual suspended sludge, and separating the mica-talc mixture containing entrained sludge from said treated oil.

8. The process of refining viscous hydrocarbon oil, which comprises treating the oil with sulfuric acid, settling and removing the major portion of the sludge, then agitating the treated oil with from about 0.1% to about 0.5% by weight of finely-divided mica and talc to gather residual suspended sludge, the ratio of mica to talc being about 2 parts to 1 by weight, and separating the mica-talc mixture containing entrained sludge from said treated oil.

9. In a process of refining viscous hydrocarbon oil, the steps which comprise agitating said oil with sulfuric acid, in the presence of a small quantity of finely-divided mica and talc, and separating from the treated oil the mica-talc mixture containing entrained acid sludge.

10. In a process of refining viscous hydrocarbon oil, the steps which comprise intimately contacting said oil with sulfuric acid and a small quantity of finely-divided mica and talc, separating from the treated oil the mica-talc mixture containing entrained acid sludge, and neutralizing the treated oil with an alkaline agent.

VLADIMIR L. CHECHOT.